United States Patent [19]

Suga et al.

[11] Patent Number: 4,539,869
[45] Date of Patent: Sep. 10, 1985

[54] LOCK-UP CONTROL SYSTEM FOR LOCK-UP TYPE AUTOMATIC TRANSMISSION

[75] Inventors: Masaaki Suga, Yokohama; Yoshiro Morimoto, Yokosuka; Hideo Hamada, Yokosuka; Masaaki Futagi, Yokosuka; Tadashi Suzuki, Yokosuka, all of Japan

[73] Assignee: Nissan Motor Co., Ltd., Yokohama, Japan

[21] Appl. No.: 280,818

[22] Filed: Jul. 6, 1981

[30] Foreign Application Priority Data

Jul. 7, 1980 [JP] Japan .................. 55-91639

[51] Int. Cl.³ .......................................... B60K 41/18
[52] U.S. Cl. ...................................... 74/866; 74/731; 74/869
[58] Field of Search .................. 74/856, 861, 862, 865, 74/866, 867, 868, 869, 731

[56] References Cited

U.S. PATENT DOCUMENTS

| | | | |
|---|---|---|---|
| 2,856,794 | 10/1958 | Simpson | 74/763 |
| 3,073,179 | 1/1963 | Christenson | 74/733 |
| 3,448,640 | 6/1969 | Nelson | 74/866 |
| 3,693,478 | 9/1972 | Malloy | 74/731 |
| 3,705,642 | 12/1972 | Thompson | 74/869 |
| 3,710,652 | 1/1973 | Miyazaki | 74/869 |
| 3,752,282 | 8/1973 | Espenshied | 192/3.58 |
| 3,805,640 | 4/1974 | Schneider et al. | 74/645 |
| 3,857,302 | 12/1974 | Morris | 74/733 |
| 3,938,409 | 2/1976 | Uozumi | 74/866 |
| 3,985,046 | 10/1976 | Morris et al. | 74/733 |
| 4,026,169 | 5/1977 | Kuhnle et al. | 74/861 |
| 4,027,554 | 6/1977 | Ito et al. | 74/866 |
| 4,034,627 | 7/1977 | Mizote | 74/866 |
| 4,046,033 | 9/1977 | Hashimoto et al. | 74/869 |
| 4,095,486 | 6/1978 | Ohnuma | 192/3.29 |
| 4,100,530 | 7/1978 | den Brinker et al. | 340/53 |
| 4,148,231 | 4/1979 | Redzinski | 74/866 |
| 4,208,929 | 6/1980 | Heino et al. | 74/731 |
| 4,236,617 | 12/1980 | Whateley | 192/3.3 |
| 4,262,335 | 4/1981 | Ahlen et al. | 364/431 |
| 4,270,636 | 6/1981 | Sunohara et al. | 192/3.31 |
| 4,271,939 | 6/1981 | Iwanaga et al. | 192/3.3 |
| 4,349,088 | 9/1982 | Ito et al. | 192/3.3 |
| 4,369,865 | 1/1983 | Sunohara et al. | 192/3.31 |
| 4,373,619 | 2/1983 | Schritt et al. | 192/0.09 |

FOREIGN PATENT DOCUMENTS

| | | | |
|---|---|---|---|
| 878321 | 12/1979 | Belgium . | |
| 2422083 | 11/1979 | France . | |
| 2422082 | 11/1979 | France . | |
| 2435639 | 9/1980 | France . | |
| 55-69353 | 5/1980 | Japan . | |
| 1536657 | 12/1978 | United Kingdom . | |
| 2017840 | 10/1979 | United Kingdom | 192/3.31 |

Primary Examiner—Allan D. Herrmann
Assistant Examiner—Joseph M. Rolnicki
Attorney, Agent, or Firm—Schwartz, Jeffery, Schwaab, Mack, Blumenthal & Evans

[57] ABSTRACT

A lock-up control system for a lock-up type automatic transmission of an automotive vehicle.

The lock-up control system functions to temporally release lock-up operation of a torque converter of the transmission upon occurrence of a gear shift signal even if the automotive vehicle is operating within any one of lock-up ranges. Gear shifting detector means generates a gear shift signal having a time duration which is variable corresponding to the time duration of a corresponding gear shifting operation. The duration of the gear shift signal generated by the gear shifting signal may also be variable also with the magnitude of engine load.

12 Claims, 9 Drawing Figures

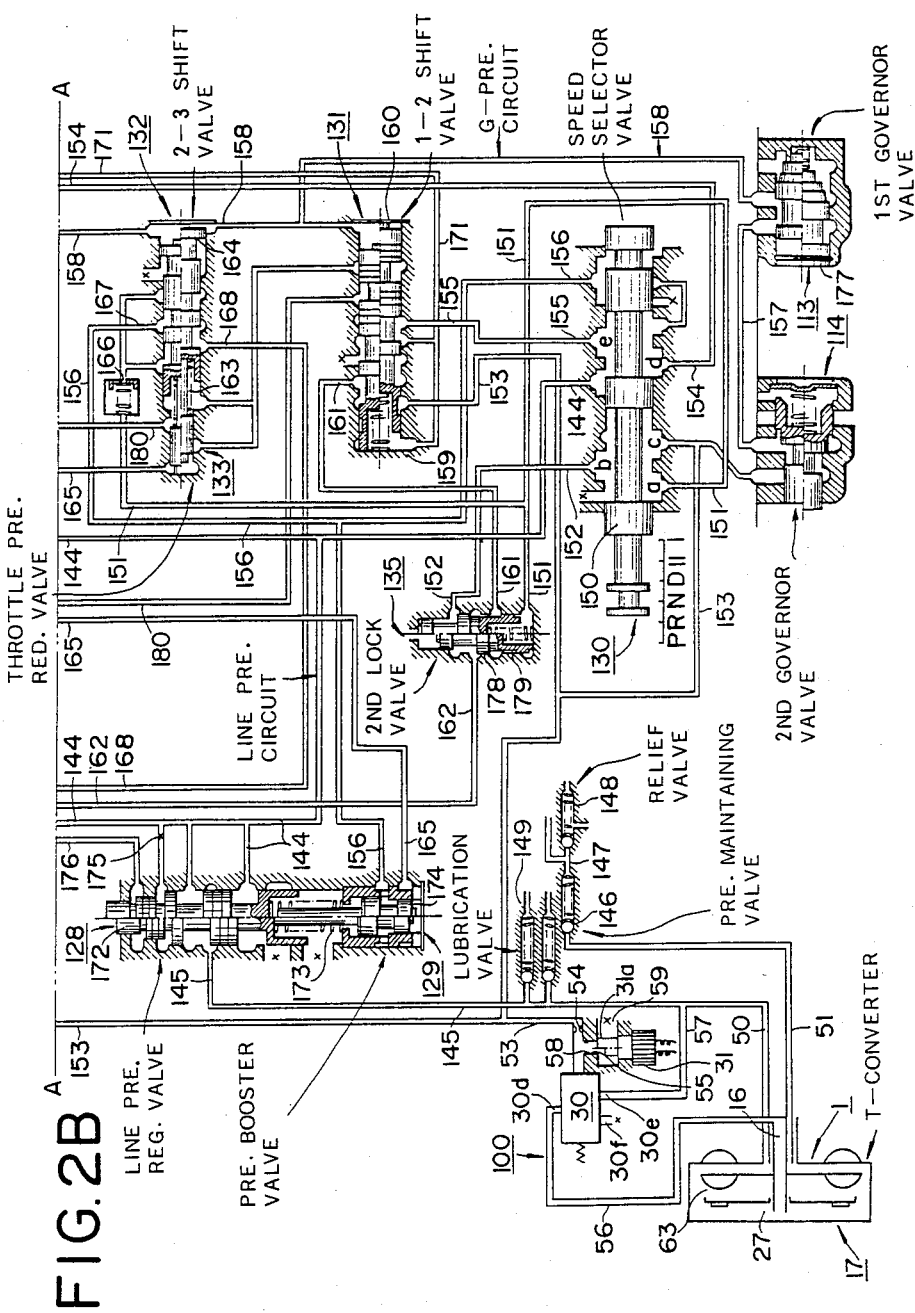

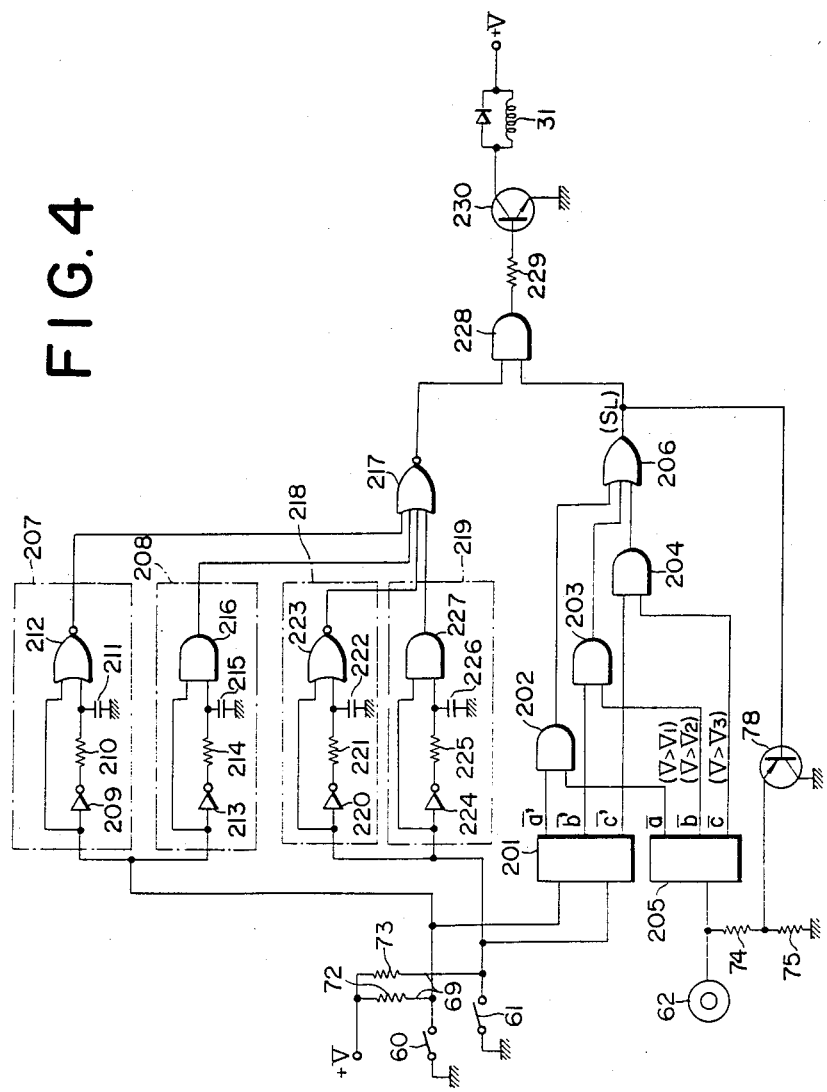

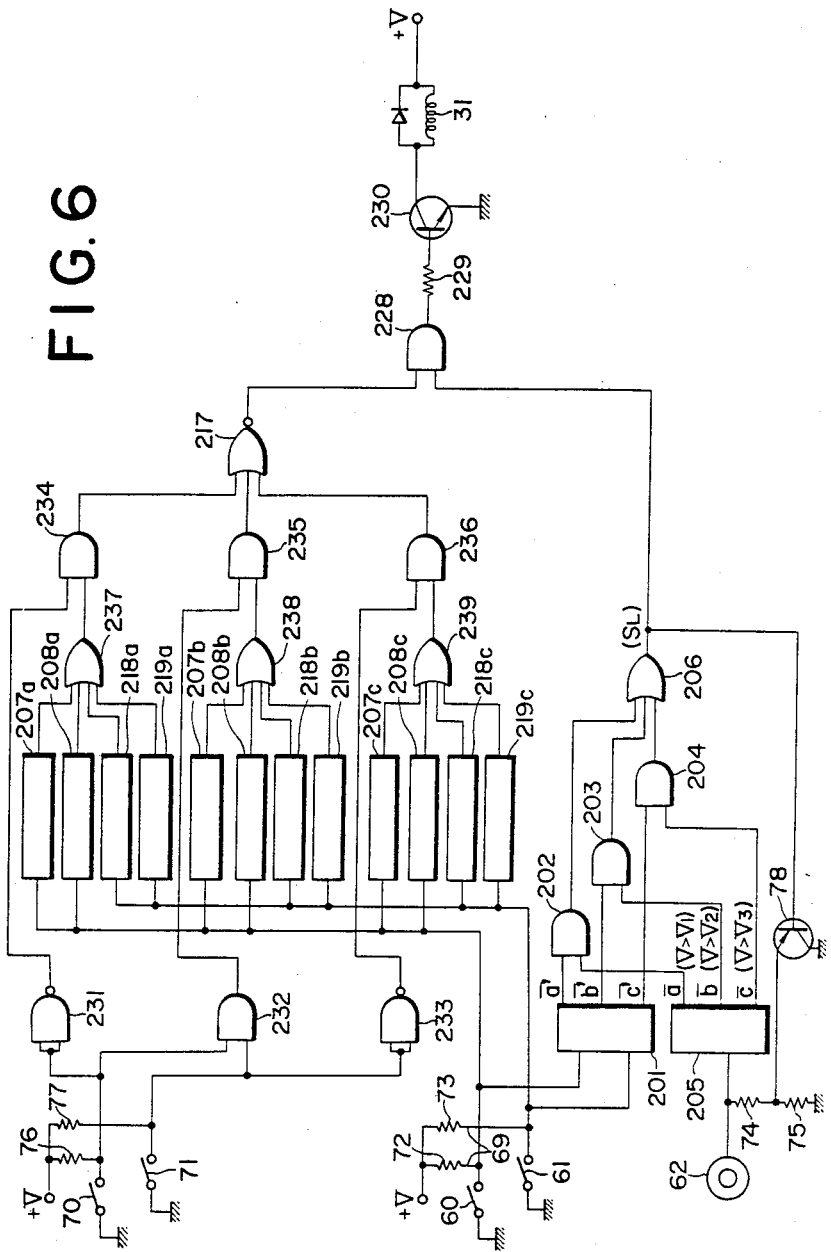

LOCK-UP CONTROL SYSTEM FOR LOCK-UP TYPE AUTOMATIC TRANSMISSION

BACKGROUND OF THE INVENTION

1. Field of the Invention

The present invention relates to a lock-up control system for a lock-up type automatic transmission.

2. Description of the Prior Art

Automatic transmissions are provided with torque converters in their power transmission systems to increase torque from the engine. The torque converter has a pump impeller driven by the engine to rotate an operating oil within the torque converter wherein the rotation of the operating oil causes a turbine runner to rotate under the reaction of a stator thereby multiplying the torque (torque converter state). The torque converter, while in use, cannot help avoiding a slip between its pump impeller and its turbine runner, and therefore the automatic transmission provided with such torque converter in its power transmission system has an advantage of easy operation, but has a drawback of poor power transmission effeciency that leads to poor fuel economy. To alleviate this drawback, there has been proposed a so-called torque converter with a direct clutch (often referred also to as a lock-up torque converter) wherein during a relatively high vehicle speed operation range when the torque variation of the engine does not create a problem the turbine runner is directly connected to the pump impeller (lock-up state) thereby eliminating slip therebetween. A lock-up type automatic transmission provided with a torque converter of this kind in a power transmission system thereof is already employed in some vehicles.

In the case of an automatic transmission having a torque converter which locks up whenever the vehicle operates in one of the forward gear ratios and at a vehicle speed exceeding a predetermined vehicle speed which is set for operation in such gear ratio, since the lock-up ranges adjoin one another or overlap one another with respect to vehicle speed, when the vehicle operates with an accelerator pedal depressed deeply, gear shifting takes place with the torque converter in the lock-up state when the automotive vehicle operates within any one of the lock-up ranges and with the accelerator pedal depressed deeply. If the gear shifting takes place with the torque converter left in the lock-up state, the torque variation owing to gear shifting is not absorbed by the torque converter, thus allowing a great shock to take place upon gear shifting.

Accordingly, it has been proposed to temporally release the lock-up state during gear shifting operation even when the vehicle is operating within one of the lock-up ranges so as to allow the torque converter to operate in the torque converter state. For this purpose, a gear shifting detector is provided that generates a gear shift signal having a predetermined time duration in response to and after the occurrence of a command for gear shifting between adjacent two gear ratios, thereby temporarlly releasing the lock-up state while the shift signal is present.

In the proposed system, however, the duration of generation of a gear shift signal from each ear shifting detector circuit is constant, so that the suspention of the lock-up state which is caused by the gear shift signal continues during a constant duration irrespective of kinds of gear shifting commands. The time duration for the automatic transmission to carry out the acutal gear shifting operation differs, owing to the construction of a hydraulic circuit, depending upon the kind of gear shifting commands, viz., which friction unit or units are involved in the particular shifting in the automatic transmission, or depending upon an upshift or downshift even with the same adjacent two gear ratios. Therefore, if the lock-up suspending time duration is constant, even though it might conform to the proper time duration for a certain gear shifting operation, it does not conform to the proper time duration for other gear shifting operations, and is longer or shorter than the actual gear shifting duration, thus causing the occurrence of a gear shift shock or driving feel impairment.

SUMMARY OF THE INVENTION

In this respect the present invention provides a lock-up type automatic transmission wherein a gear shifting detector circuit is so designed that the duration of generation of a gear shift signal is variable so as to conform a time duration of suspension of a lock-up state to various kinds of gear shifting operations, thus solving the above-mentioned problem.

The duration for actual gear shifting varies with varying engine load. That is because the magnitude of line pressure which is used for actuating friction elements involved in gear shifting varies with the magnitude of the engine load, and the line pressure increases with increasing engine load under which condition the actual gear shifting takes place during a relatively short duration.

Therefore, the present invention also proposes a lock-up type automatic transmission wherein a gear shifting detector circuit is so designed that the time duration of generation of a gear shift signal is variable also with varying engine load so as to bring the duration of suspension of lock-up state of the torque converter into conformity to each of various kinds of gear shifting and engine load states.

BRIEF DESCRIPTION OF THE DRAWINGS

The present invention will be apparent from the following description and drawings in which:

FIGS. 2A and 2B, when combined, provide a schematic view of a hydraulic control portion of the lock-up type automatic transmission;

FIG. 4 is a block diagram of a lock-up control system according to the present invention;

FIG. 6 is a block diagram of a second embodiment of a lock-up control system according to the present invention.

DESCRIPTION OF THE PREFERRED EMBODIMENTS

Figure 1:
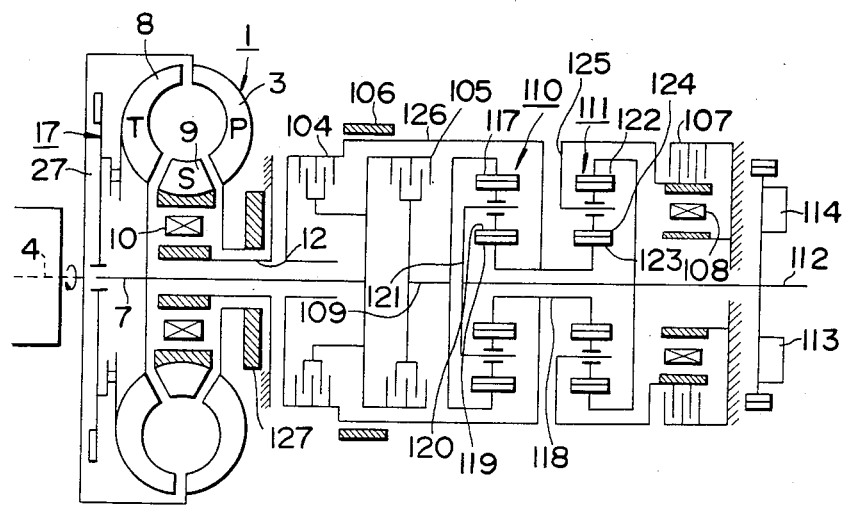
FIG. 1 is a schematic view of a planetary gearing portion of a lock-up type automatic transmission.

Referring to the drawings and particularly to FIG. 1, there are shown a crank shaft 4 driven by a prime mover, an engine, a torque converter 1 having a lock-up clutch 17 which will be described later, an input shaft 7, a front clutch 104 (a high-and-reverse clutch), a rear clutch 105 (a forward clutch), a second brake 106, a low reverse brake 107, a one-way brake 108, an intermediate shaft 109, a first planetary gear unit 110, a second planetary gear unit 111, an output shaft 112, a first governor valve 113, a second governor valve 114, and an oil pump 13. The torque converter 1 comprises a pump impeller 3, a turbine runner 8, and a stator 9, in which the pump impeller 3 is driven by the crank shaft 4 to circulate the torque converter operation oil therein so as to transmit torque to the turbine runner 8 fixed on the input shaft 7. The torque is further transmitted by the input shaft 7 to a change-speed planetary gearing. The stator 9 is disposed on a sleeve 12 through a one-way clutch 10, the one-way clutch allowing the stator 9 to rotate in the same direction as the crankshaft 4, that is, in the direction indicated by an arrow in FIG. 1 (this rotation is referred to as forward rotation hereinafter), but not allowing it to rotate in the reverse direction (this rotation is referred to as reverse rotation hereinafter). The first planetary gear unit 110 comprises an internally toothed gear 117 fixed on the intermediate shaft 109, a sun gear 119 fixed on a hollow transmitting shaft 118, and more than one planetary pinions 120 capable of performing rotation and revolution simultaneously while meshing with the internally toothed gear 117 and sun gear 119 respectively, and a planetary pinion carrier 121 for supporting the planetary pinions 120 fixed on an output shaft 112, wherein the second planetary gear unit 111 comprises an internally toothed gear 122 fixed on the output shaft 112, a sun gear 123 fixed on the hollow transmitting shaft 118, and more than one planetary pinions 124 capable of performing rotation and revolution while meshing with the internally toothed gear 122 and sun gear 123 respectively, and a planetary pinion carrier 125 for supporting the planetary pinions 124. The front clutch 104 is operative to connect the input shaft 7 to be drive by the turbine runner 8 to the hollow transmitting shaft 118 integrally rotatable with both of the sun gears 119 and 123 through a drum 126, whereas the rear clutch 105 is operative to connect the input shaft 7 to the internally toothed gear 117 of the first planetary gear unit 110 through the intermediate shaft 109. The second brake 106 is operative to anchor both sun gears 119 and 123 by braking the drum 126 fixed on the hollow transmitting shaft 118, whereas the low reverse brake 107 is operative to anchor the pinion carrier 125 of the second planetary gear unit 111. The one-way brake 108 allows forward rotation of the pinion carrier 125 but not reverse rotation thereof. The first and second governor valve assemblies 113 and 114 are operatively connected to the output shaft 112 and produce governor pressure in response to the vehicle speed.

Now, power flow paths to be established when a manual speed selector rod is set in D position (forward drive range) will be explained.

In this case, only the rear clutch 105, a forward clutch, is in engaged condition. The power output of the engine via the torque converter 1 is transmitted by the input shaft 7 and rear clutch 105 to the internally toothed gear 117 of the first planetary gear unit 110. This rotation of the internally toothed gear 117 causes the planetary gears 120 to rotate forwardly. Accordingly, the sun gear 119 rotates reversely, and, since the sun gear 123 of the second planetary gear unit 111 which is rotatable with the sun gear 119 rotates reversely, the planetary gears 124 of the second planetary gear unit 111 rotates forwardly. The one-way brake 108 acts as a forward reaction brake to prevent the pinion carrier 125 from being rotated reversely by the sun gear 123, thus causing the forward rotation of the internally toothed gear 122 of the second planetary gear unit 111. Accordingly, the output shaft 112 which is rotatable with the internally toothed gear 122 rotates forwardly, thereby the first forward gear ratio being established.

If, in this state, the vehicle speed increases enough to cause the application of the second brake 106, the power flow path through the input shaft 7 and rear clutch 105 up to the internally toothed gear 117 is the same as that for the first forward speed. The second brake 106 acts as a forward reaction brake to anchor the drum 126 for preventing the rotation of the sun gear 119. This causes the planetary pinions 120 to rotate, revolving simultaneously, around the anchored sun gear 119, and accordingly the planetary pinion carrier 121 and output shaft 112, which is rotatable with the pinion carrier 121, rotate at a faster speed than in the case of the first speed although with a certain reduction ratio, thereby the second forward gear ratio being established.

If the vehicle speed further increases so as to cause the second brake 106 to be released and, in lieu thereof, the front clutch 104 to be engaged, the power on the input shaft 7 is transmitted partially through the rear clutch 105 to the internally toothed gear 117, while the remainder is transmitted through the front clutch 104 to the sun gear 119. Thus, the internally toothed gear 117 and sun gear 119 are interlocked and rotate forwardly, as a unit, together with both the pinion carrier 121 and output shaft 112 at the same rotational speed, thereby the third forward gear ratio being established. In this case, the input is fed to both the front clutch 104 and rear clutch 105 and the torque increase is not carried out by the planetary gears so that none acts as a reaction brake in this state.

Nextly, the power transmission path in the case when the selector rod is positioned in R (rearward running) position is explained.

In this case, the front clutch 104 andlow-reverse-brake 107 are engaged. The driving power transferred from the engine through the torque converter 1 is transferred from the input shaft 7 through the front clutch 104 and the drum 126 up to the sun gears 119 and 123. In this state, since the rear planet carrier 125 is anchored by the low-reverse brake 107, the forward rotation of the sun gears 119 and 123 causes the internal gear 122 to rotate in reverse direction at a reduction speed, thus causing the output shaft 112 that is in rotary unison with this internal gear to produce a reverse drive ratio.

The planetary gearing arrangement illustrated in and described in connection with FIG. 1 is similar in construction to the planetary gearing arrangement disclosed in U.S. Pat. No. 2,856,794 issued to H. W. Simpson, on Oct. 21, 1958, and reference thereto may be made for a more complete description of the construction and operation of the transmission.

Figure 2A:
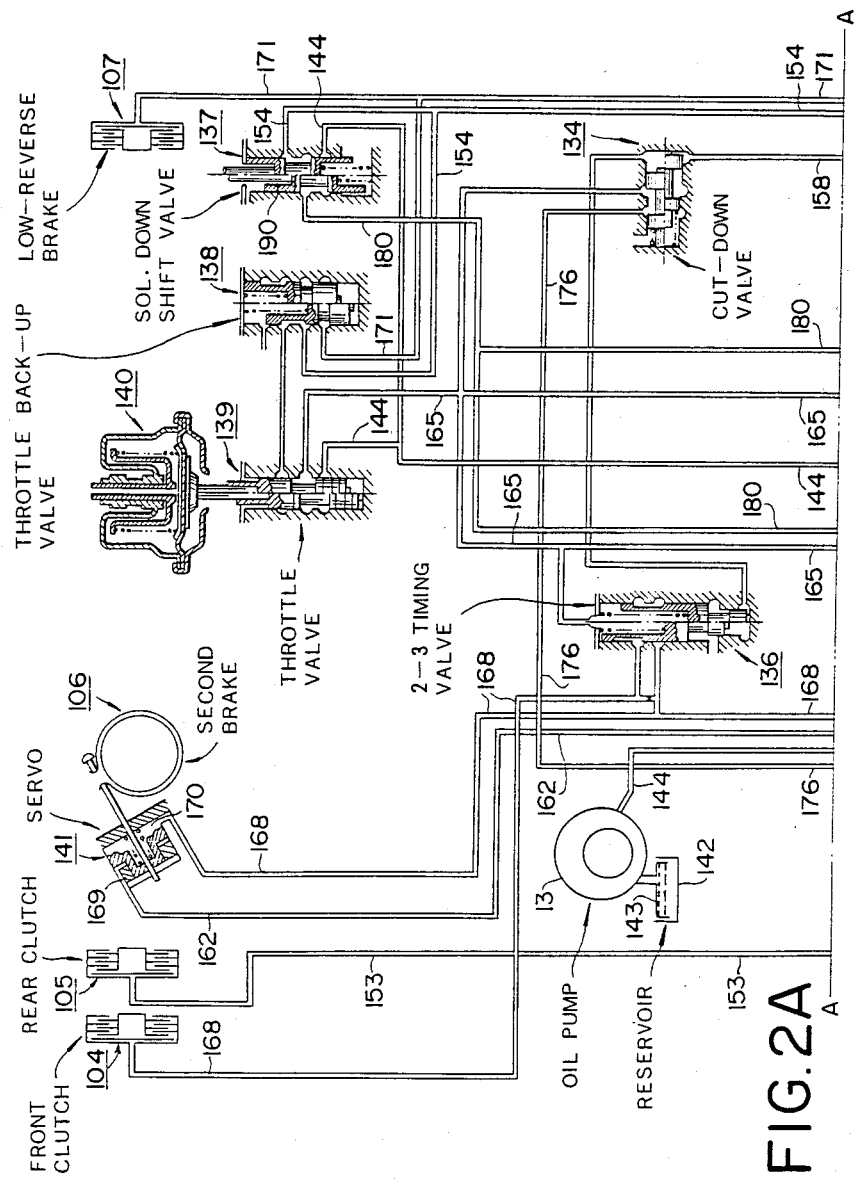

FIGS. 2A and 2B show a hydraulic control system of the above-described change speed transmission, which control system comprises an oil pump 13, a line pressure regulator valve 128, a pressure booster valve 129, a torque converter 1, a speed selector valve 130, a first governor valve 113, a second governor valve 114, a 1-2 shift valve 131, a 2-3 shift valve 132, a throttle pressure reducing valve 133, a cut-down valve 134, a second lock valve 135, a 2-3 timing valve 136, a solenoid down shift valve 137, a throttle back-up valve 138, a vacuum throttle valve 139, a vacuum diaphragm 140, a front clutch 104, a rear clutch 105, a second brake 106, a servo 141, a low-reverse brake 107, and oil pressure circuits. The oil pump 13 is driven by a prime mover through the driving shaft 14 and the pump impeller P of the torque converter 1 for drawing oil from a reservoir 142 through a strainer 143, where harmful dust is removed, during all operating conditions of the prime mover to send the oil to a line pressure circuit 144. The oil is regulated by the line pressure regulator valve 128 and the thus regulated oil is transmitted to the torque converter 1 and speed selector valve 130.

The hydraulic control system illustrated in FIGS. 2A and 2B is similar in construction to the hydraulic control system disclosed in U.S. Pat. No. 3,710,652, issued to T. Miyazaki, on Jan. 16, 1973, and reference may be made for a more complete description of the construction and operation of the transmission.

The line pressure regulator valve 128 comprises a spool 172 and a spring 173, in which, in addition to the spring 173, the throttle pressure in a circuit 165 and the line pressure in a circuit 156 act on the spool 172 via a spool 174 of the pressure booster valve 129 against the line pressure from a circuit 144 through an orifice 175 and the pressure from a circuit 176 both acting on upper areas of the spool 172.

The torque converter operating oil pressure is introduced from the circuit 144 through the line pressure regulating valve 128 to a circuit 145 and, with a pressure maintaining valve 146, the level of this pressure is maintained within a certain range. When the pressure exceeds a certain level, the pressure maintaining valve 146 opens to permit the oil into a circuit 147 toward the rear lubricating part of the power transmitting mechanism. When the lubricating oil pressure is too high, a relief valve 148 opens, resulting in a pressure drop. On the other hand, the lubricating oil is supplied from the circuit 145 through a front lubrication valve 149, as it is open, to the front lubricating part of the power transmitting mechanism. The speed selector valve 130 is a manually operable liquid direction switching valve and it comprises a spool 150, and is connected to a speed selector rod (not shown) through a linkage so that manipulating the speed selector rod into any desired one of the positions causes the spool 150 to change the passage of the line pressure circuit 144. FIG. 2B shows a condition of the speed selector valve when the spool takes up the N (neutral) position, wherein the line pressure circuit 144 is permitted to communicate with to two ports d and e.

The first and second governor valves 113 and 114 are in operative condition to produce a governor pressure while the automobile is moving forwardly. When the speed selector valve 130 assumes either D, II or I position, the oil pressure is fed from the line pressure circuit 144 to the second governor valve 114 through the port c of the speed selector valve 130. If under this condition the automobile begins to move, the governor pressure regulated by the second governor valve 114 is supplied to a circuit 157 leading to the first governor valve 113, and subsequently when the vehicle speed reaches a predetermined value, the spool 177 of the first governor valve 113 moves to a position wherein the circuit 157 communicates with a circuit 158, supplying the latter with the governor pressure regulated by the second governor valve 114. The governor pressure is also supplied to the circuit 158, thus acting on the respective end surfaces of the 1-2 shift valve 131, 2-3 shift valve and cut-down valve 134 against the respective springs which urge these valves toward respective lower half positions illustrated in FIGS. 2A and 2B.

In the oil flow passageway leading from the port c of the speed selector valve 130 through a circuit 153, a circuit 61 and a circuit 162, up to an apply side oil pressure chamber 169, the 1-2 shift valve 131 and second lock valve 135 are separately arranged, and a circuit 152 leads from the port b of the speed selector valve 130 to the second lock-up valve 135.

Accordingly, if the speed selector rod is set in D position, the spool 150 of the speed selector valve 130 is moved to a position providing communication between the line pressure circuit 144 and ports a, b and c. From the port a, the oil pressure is transmitted through the circuit 151 to the second lock valve 135 to act on the lower end thereof for preventing the interruption of the circuits 161 and 162 which are permitted to communicate with each other when the spool 178 is pushed down, which spool is urged upwardly by a spring 179 and urged downwardly by the oil pressure transmitted thereto through the circuit 152 from the port b, while, the oil pressure at the port a is transmitted through an orifice 166 and a circuit 167 to the 2-3 shift valve 132. The oil pressure at the port c is transmitted through a circuit 153 to the second governor valve 114, rear clutch 105, and 1-2 shift valve 131, thereby the first forward gear ratio condition of the transmission being provided.

When, under this condition, the vehicle speed increases up to a certain level the governor pressure in the circuit 158 urges the spool 160 to the 1-2 shift valve 131, which is urged to the right by the spring 159, to move to the left, for effecting an upshift from the first forward speed to the second forward speed, and, as a result, the circuit 153 is permitted to communicate with the circuit 161 thereby allowing the oil pressure to be transmitted through the second lock valve 135 to the apply side oil pressure chamber 169 of the servo 141 through a circuit 162 to apply the second brake 106, thus establishing the second forward gear ratio condition.

When the vehicle speed further increases up to another certain level, the governor pressure in the circuit 158 urges the spool 164 of the 2-3 shift valve 132 to the left overcoming the spring 163, so that the circuit 167 is permitted to communicate with the circuit 168 directing the oil pressure, through the circuit 168, to the release-side oil pressure chamber 170 of the servo 141 so as to release the second brake 106 and also to the front clutch 104 to engage the clutch 104, thus the third forward gear ratio condition is established.

If the driver depresses the accelerator pedal down to a position causing the full opening of the throttle valve during operation with the speed selector lever in D position, an unillustrated kickdown switch is closed or rendered on to energize a downshift solenoid (not illustrated) for the solenoid downshift valve 137. This urges the spool 190 of the solenoid downshift valve 137 downwardly against a spring 191 from the locked position as illustrated by the right half in FIG. 2A. This movement of the spool 190 allows the kickdown circuit 180 to communicate with the line pressure circuit 144, thus allowing transmission of line pressure through the circuits 144 and 180 to the 1-2 shift valve 131 and the 2-3 shift valve 132 to act same in opposed relationship with the governor pressure. If, under this condition, the vehicle is operating in the third gear ratio, the spool 164 of the 2-3 shift valve is forced to move against the governor pressure toward the right hand position viewing in FIG. 2B by the above-mentioned line pressure, thus effecting a forced downshift from the third gear ratio to the second gear ratio when the vehicle speed falls in a predetermined range, thus providing a sufficient amount of acceleration force. If the above-mentioned kickdown is carried out during operation in the second gear ratio, since the governor pressure is relatively low, the spool 160 of the 1-2 shift valve 131 is forced to move rightwardly against the governor pressure from the left hand position. This causes a forced downshift from the second gear ratio to the first gear ratio, thus providing a sufficient amount of acceleration force to meet the relatively heavy load.

If the speed selector lever is moved to the II position (2nd forward speed fixed), the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward speed is prevented.

As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging to press the spool 160 to the right in cooperation with the spring 159, thereby locking the transmission in the first forward speed once a downshift is made thereto.

In FIG. 2B, the reference numeral 100 denotes a lock-up control system according to the present invention which control system comprises a lock-up control valve 30 and a lock-up solenoid 31.

Figure 3A:
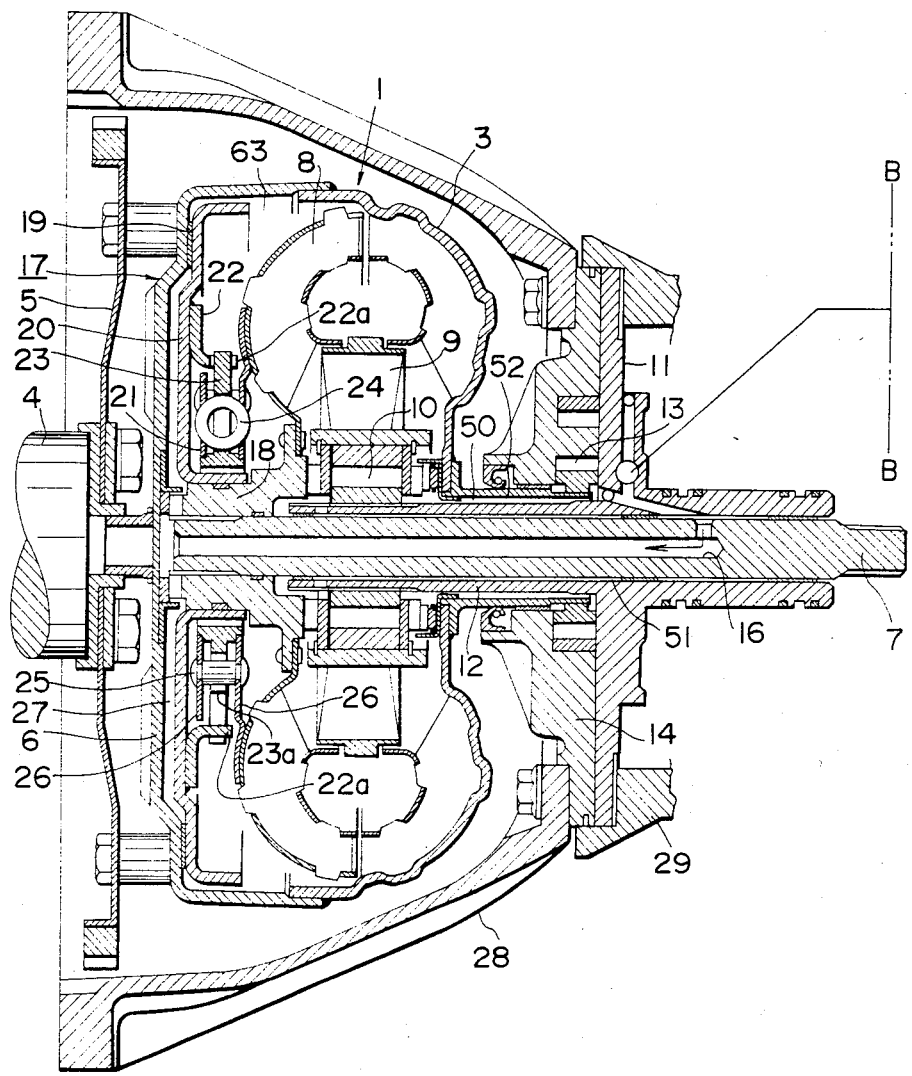
FIGS. 3A and 3B, when combined, provide a schematic sectional view showing the torque converter with the lock-up clutch, lock-up control valve and lock-up solenoid shown in FIG. 2B.
Figure 3B:
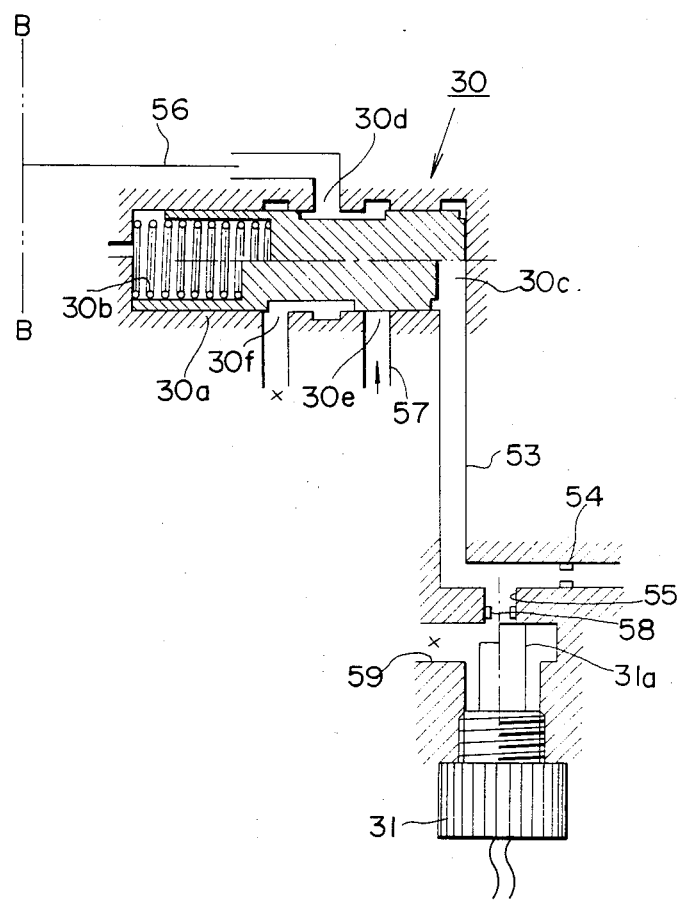

Referring to FIGS. 3A and 3B, the lock-up control valve 30, lock-up solenoid 31 and torque converter 1 with a lock-up mechanism are specifically explained hereinafter.

If the speed selector lever is moved to the II position (2nd forward speed fixed), the spool 150 of the speed selector valve 130 is moved to a position providing communication between the line pressure circuit 144 and the ports b, c and d. The oil pressure at the port b is fed to the same place as in the case of D and the oil pressure at the port c is fed to the rear clutch to engage the latter. Because, under this condition, the oil pressure does not act on the lower end of the second lock valve 135 and because the lower land has a larger area than the upper land, which lands form a space on the spool 178 opening to the circuit 152, the spool 178 of the second lock valve 135 is pressed downwardly against the force of the spring 178 to assume a position in which the circuit 152 is permitted to communicate with the circuit 162, permitting the oil pressure to reach the apply side oil pressure chamber 169 of the servo 141 so as to effect application of the second brake 106, thereby the second forward gear ratio condition being established. The oil pressure at the port d is transmitted through the circuit 154 to the solenoid down shift valve 137 and throttle back-up valve 138. Since the communication between the line pressure circuit 144 leading to the speed selector valve 130 and the port a thereof is prevented, the oil pressure does not get through the circuit 151 to the 2-3 shift valve 132, thus neither release of the second brake 106 nor the application of the front clutch 104 will take place, so that an upshift to the third forward speed is prevented. As explained, the second lock valve 135 cooperates with the speed selector valve 130 to lock the transmission in the second forward speed. If the speed selector lever is moved to I position (the first forward speed fixed), the line pressure circuit 144 is permitted to communicate with the ports c, d and e. The oil pressure at the port c reaches the rear clutch 105 to effect clutch engagement and the oil pressure at the port d reach the same places as in the case of II, whereas the oil pressure at the port e is transmitted through the circuit 155, 1-2 shift valve 131 and the circuit 171 to the low-reverse brake 107 so as to apply the low reverse brake 107 which, when applied, acts as a forward reaction brake, thereby rendering the transmission in the first forward gear ratio condition. The oil pressure at the port e is applied to the left end of the 1-2 shift valve assembly 131, through the circuit 171, urging to press the spool 160 to the right in cooperation with the spring 159, thereby locking the transmission in the first forward speed once a downshift is made thereto.

The pump impeller 3 of the torque converter 1 is connected via a torque converter cover 6 with a drive plate 5, which drive plate is connected to the engine crank shaft 4. The turbine runner 8 is splined to an input shaft 7 with a hub 18, and further the stator 9 is connected to the sleeve 12 via the one-way clutch 10. The torque converter 1 is enclosed by a converter housing 28 which is connected together with a pump housing 14 and a pump cover 11 to a transmission case 29. The pump housing 14 and pump cover 11 cooperate to define a chamber within which said oil pump 13 is accommodated, which pump is connected to the pump impeller 3 through a hollow shaft 52 driven by the engine. The hollow shaft 52 jackets therein a sleeve 12 to define an annular oil feed passage 50 for said operating oil, and the sleeve 12 allows the input shaft 7 to extend therethrough and cooperate to define therebetween an oil discharge passage 51 for said operating oil. The sleeve 12 is formed integrally with the pump cover 11.

The lock-up mechanism 17 has the following structure. A lock-up clutch piston 20 is fit around the hub 18 in an axially slidable manner, and this lock-up clutch piston is accommodated within the converter cover 6. The lock-up clutch piston 20 has an annular clutch facing 19 fixed to a surface thereof positioned opposite to the end wall of the torque converter cover 6, thereby to provide an arrangement wherein when this clutch facing contacts with the end wall of the converter cover 6, a lock-up clutch chamber 27 and a torque converter chamber 63 are defined on the opposite sides of the lock-up clutch piston 20.

The lock-up clutch piston 20 is drivingly connected to the turbine runner 8 via a torsional damper 21. The torsional damper 21 is of the same type as that used in a dry-type clutch and the like and comprises a drive plate 23, torsional springs 24, rivets 25 and driven plates 26. An annular member 22 is welded to the lock-up clutch piston 20 and has its claws 22a drivingly engaging in cutouts 23a formed through the drive plate 23, and the driven plate 26 is attached to the turbine runner 8. The lock-up chamber 27 communicates with a lock-up passage 16 formed through the input shaft 7, which lock-up passage is operatively associated with said lock-up control system 100.

The lock-up control valve 30 is provided with a spool 30a which when taking an illustrated upper half position in FIG. 3B, permits a port 30d to communicate with a port 30e and, when taking an illustrated lower half position, permits the port 30d to communicate with a drain port 30f. The port 30d communicates through a passage 56 with the lock-up passage 16, the port 30e communicates through a branch passage 57 with a torque converter operating oil supply passage 50 as shown in FIG. 2B, and the chamber 30c communicates through a passage 53 with the rear clutch pressure passage 153 as shown in FIG. 2B.

An orifice 54 is provided in the passage 53 at an intermediate portion, and the passage 53 has a branch passage 55 from a location between this orifice and the chamber 30c. The branch passage 55 has therein an orifice 58 and communicates with a drain port 59 and is associated with the lock-up solenoid 31 adapted to open and close the branch passage 55. For this purpose, the lock-up solenoid 31 has a plunger 31a which normally takes an illustrated left half position in FIG. 2B or FIG. 3B, but when the solenoid 31 is energized, projects to assume an illustrated right half position to close the branch passage 55.

When the solenoid 31 is not energized to allow the plunger 31a to open the branch passage 55, this branch passage communicates with a drain port 59. Then, the rear clutch pressure in the passage 53 and directed toward the chamber 30c is discharged through a drain port 59, thus allowing the lock-up control valve 30 to communicate the port 30d with the port 30e because the spool 30a is urged by a spring 30b to take the illustrated upper half position in FIG. 3B. Therefore, a torque converter interior pressure reaching the passage 57 is supplied through the ports 30e, 30d, passage 56, passage 16 to the lock-up chamber 27, thus causing the pressure within the lock-up chamber 27 to have the same pressure value as that within the converter chamber 63. This causes the lock-up clutch piston 20 to move rightwardly from the illustrated FIG. 3A position to disengage its clutch facing 19 from end wall of the converter cover 6, thus releasing the direct connection between the pump impeller 3 and the turbine runner 8, allowing the torque converter 1 to transmit the power in the torque converter state.

When the lock-up solenoid 31 is energized to cause the plunger 31a to close the branch passage 55, the rear clutch pressure is supplied through the passage 53 to the chamber 30c, allowing the lock-up control valve 30 to communicate the port 30d with the drain port 30f because the spool 30a is moved leftwardly from the illustrated upper half position to the illustrated lower half position in FIG. 3B. This causes the lock-up chamber 27 to communicate through the lock-up passage 16, passage 56, port 30d to a drain port 30f, causing the pressure therein to zero. Then, the lock-up clutch piston 20 is moved leftwardly as viewed in FIG. 3 by means of the torque converter interior pressure to be pressed into contact with the end wall of the torque converter cover 6, thus establishing a lock-up state wherein the pump impeller 3 is connected directly to the turbine runner 8.

On and off of the above-mentioned lock-up solenoid 31 is controlled according to the present invention by an electronic circuit as shown in FIG. 4. In the Figure, 60 denotes a 1-2 shift switch, 61 denotes a 2-3 shift switch, and 62 denotes a vehicle speed sensor. As clearly shown in FIG. 5 for example, the 1-2 shift switch 60 and 2-3 shift switch 61 are mounted within the 1-2 shift valve 131 and the 2-3 shift valve 132, respectively, in such a manner that they open or close in response to the positions of the respective spools 160, 164. For this purpose, stationary contacts 65, 66 are mounted at opposite positions to the valve spools 160, 164, respectively, and these stationary contacts are electrically insulated from the side plate 64 with insulators 67, 68 and cooperate with the valve spools 160, 164 which act as movable contacts. Since the shift valves 131 and 132 are grounded to the vehicle body, it is only necessary to connect respective leads 69 from the stationary contacts 65, 66 to a power source +V thus enabling the stationary contact 65 and the valve spool 160 to form the 1-2 shift switch 60 and enabling the stationary contact 66 and the valve spool 164 to form the 2-3 shift switch 61.

Figure 5:
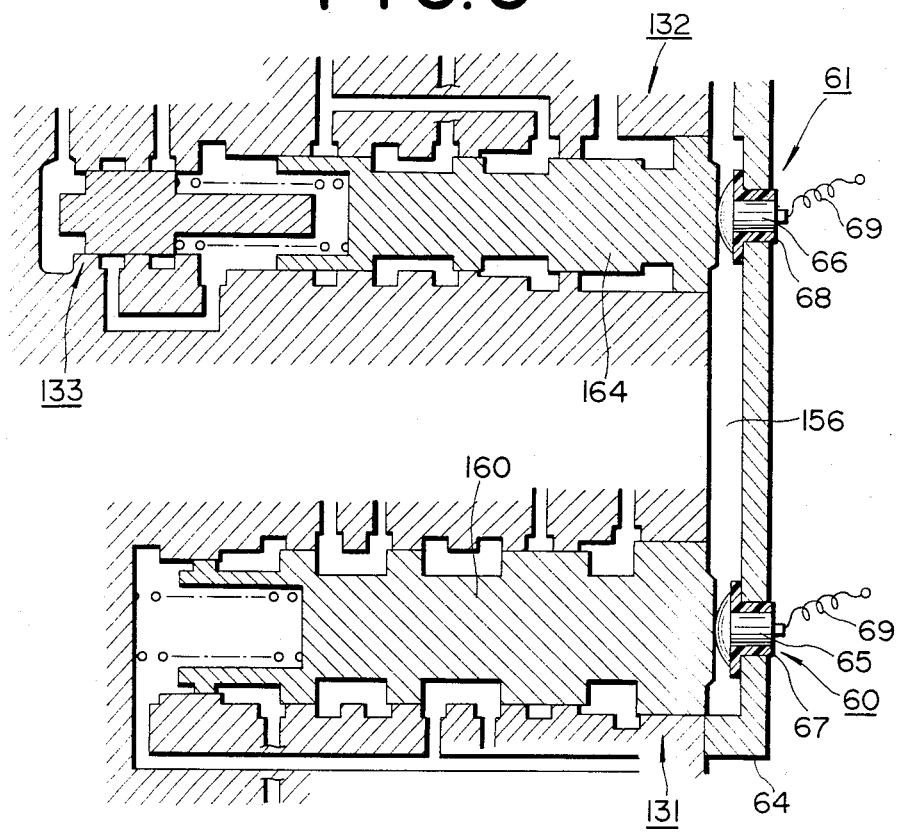
FIG. 5 is a sectional view showing the 1-2 shift valve and 2-3 shift valve incorporating the 1-2 shift switch and 2-3 shift switch shown in FIG. 4.

As will be understood from the preceding, when the transmission is in the first gear ratio, both of the valve spools 160, 164 are in contact with the stationary contacts 65, 66 as shown in FIG. 5, thus causing the 1-2 shift switch 60 and the 2-3 shift switch 61 to produce low level signals (L). When the transmission is in the second gear ratio, the valve spool 160 only is in a position moved leftwardly to disengage from the stationary contact 65, thus causing the 1-2 shift switch 60 to produce a high level signal (H). When the transmission is in the third gear ratio, the valve spool 164 is also in a position moved leftwardly to disengage from the stationary contact 66, thus causing the 2-3 shift switch 61 to also produce a H level signal.

The vehicle speed sensor 62 produces an electric current which is grounded through a resistor 74 and an emitter collector of a transistor 78 when the transistor 78 is rendered on and, when the transistor 78 is rendered off, is grounded through the resistors 74 and 75. When the circuit including the resistor 74 and the collector-emitter of the transistor 78 is closed, a voltage depending only upon the resistor 74 is produced as a vehicle speed signal V, and when the circuit passing through the resistors 74 and 75 is used, the magnitude of the vehicle speed signal V is increased by an amount corresponding to an increase in resistance provided by the resistor 75.

The signals from the above-mentioned 1-2 shift switch 60 and 2-3 shift switch 61 are fed to a gear ratio decision circuit 201, said gear ratio decision circuit decides a corresponding gear ratio (shifted speed position) depending upon various combinations as shown in the following Table of the signals from both of the shift switches 60 and 61.

| switch | gear ratio | | |
| --- | --- | --- | --- |
| | 1st | 2nd | 3rd |
| 1-2 shift switch | ON (L) | OFF (H) | OFF (H) |
| 2-3 shift switch | ON (L) | ON (L) | OFF (H) |

The gear ratio decision circuit 201 generates a H level signal at a gate $\bar{a}'$ only during operation in the first gear ratio, and a H level signal at a gate $\bar{b}'$ only during operation in the second gear ratio, and a H level signal at a gate $\bar{c}'$ only during operation in the third gear ratio which are subsequently fed to the respective one input terminals of the corresponding AND gates 202 to 204. The vehicle speed signal V from the vehicle speed sensor 62 is fed to a vehicle speed decision circuit 205, said vehicle speed decision circuit compares the vehicle speed signal V with a lock-up vehicle speed $V_1$ for first gear ratio, with a lock-up vehicle speed $V_2$ for second gear ratio and with a lock-up vehicle speed $V_3$ for third gear ratio, and generate a H level signal from a gate $\bar{a}$ when $V > V_1$, generates another H level signal also from a gate $\bar{b}$ when $V > V_2$, and generates still another H level signal also from a gate $\bar{c}$ when $V > V_3$, and feeds such signals to the other input terminals of the AND gates 202 to 204. The AND gates 202 to 204 effect AND operation between the above-mentioned signals fed thereto so that the AND gate 202 generates a H level signal during operation within the illustrated lock-up range A in FIG. 7, AND gate 203 generates a H level signal during operation within the illustrated lock-up range B in FIG. 7, and AND gate 204 generates a H level signal during operation within the illustrated lock-up range C in FIG. 7. OR gate 206 receives the outputs from these AND gates 202 to 204 so that it generates a lock-up permission signal $S_L$ during operation within any one of the lock-up ranges A, B and C.

Figure 7:
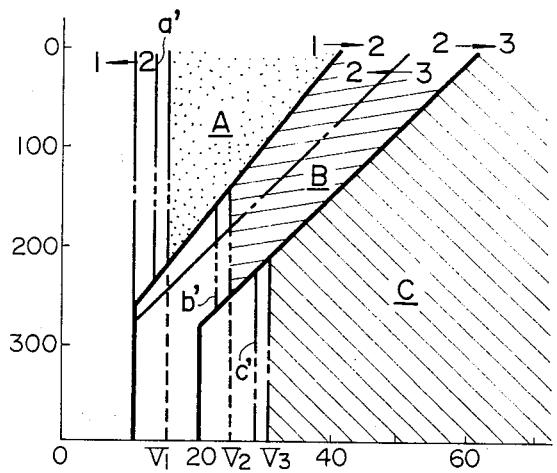
FIG. 7 is a shift pattern diagram showing lock-up ranges.

This H level lock-up permission signal $S_L$ is applied to the base of the transistor 78, rendering same off, and in this state since as described before the vehicle speed signal is in fact increased from a level actually corresponding to the vehicle speed by a constant value that is determined by the resistance of the resistor 75, the actual lock-up release vehicle speeds are lowered to take values a', b', and c' as shown in FIG. 7 which are relatively lower than the lock-up vehicle speeds $V_1$, $V_2$ and $V_3$, thus setting hysterisis between them.

The signal from the 1-2 shift switch 60 is fed to a 2-1 downshifting detector circuit 207 and also to a 1-2 upshifting detector circuit 208, wherein the circuit 207 is in the form of an edge trigger circuit which detects a 2-1 downshifting command, viz., a fall in the signal from the 1-2 shift switch 60, while, the circuit 208 is in the form of an edge trigger circuit which detects a 1-2 upshifting command, viz., a rise in the signal from the 1-2 shift switch 60. For this purpose, the circuit 207 comprises a NOT gate 209, a resistor 210, a capacitor 211 and a NOR gate 212, while, the gate 208 comprises a NOT gate 213, a resistor 214, a capacitor 215 and an AND gate 216. If the level of the signal from the 1-2 shift switch 60 falls from a H level to a L level, viz., issuance of a 2-1 downshifting command, the 2-1 downshifting detector circuit 207 allows the NOR gate 212 to continue to produce a H level signal (2-1 downshift signal) for a duration until charging of the capacitor 211 is completed, viz., a time constant of RC circuit 210, 211 for feeding this H level signal to a NOR gate 217. If the level of the signal from the 1-2 shift switch 60 rises from a L level to a H level, viz., issuance of a 1-2 upshifting command, the 1-2 upshifting detector circuit 208 allows the AND gate 216 to continue to produce a H level signal (1-2 upshift signal) for a duration until the charging of the capacitor 215 is completed, viz., a time constant of RC circuit 214,215 for feeding the H level signal to the NOR gate 217. The 2-1 downshifting detector circuit 207 and 1-2 upshifting detector circuit 208 continue to produce L level signals, respectively, in their stable states other than the above mentioned state for feeding L level signals to the NOR gate 217.

The signal from the 2-3 shift switch 61 is fed to a 3-2 downshifting detector circuit 218 and a 2-3 upshifting detector circuit 219, wherein the circuit 218 is in the form of an edge trigger circuit which detects a 3-2 downshifting command, viz., a fall in the signal from the 2-3 shift switch 61, while, the circuit 219 is in the form of an edge trigger circuit which detects a 2-3 upshifting command, viz., a rise in the signal from the 2-3 shift switch 61. For this purpose, the circuit 218 is constructed in a similar manner to the 2-1 downshifting circuit 207 and comprises a NOT gate 220, a resistor 221, a capacitor 222 and a NOR gate 223, while, the circuit 219 is constructed in a similar manner to said circuit 208 and comprises a NOT gate 224, a resistor 225, a capacitor 226 and an AND gate 227. If the level of the signal from the 2-3 shift switch 61 falls from a H level to a L level, viz., an issuance of a 3-2 downshifting command, the 3-2 downshifting detector circuit 218 allows the NOR gate 223 to continue to produce a H level signal (3-2 downshift signal) for a duration until charging of the capacitor 222 is completed, viz., a time constant of RC circuit 221, 222 for feeding this H level signal to a NOR gate 217. If the level of the signal from the 2-3 shift switch 61 rises from a L level to a H level, viz., an issuance of a 2-3 upshifting command, the 2-3 upshift detector circuit 219 allows the AND gate to continue to produce a H level signal (2-3 upshift signal) for a duration until charging of the capacitor 226 is completed, viz., a time constant of RC circuit 225,226 for feeding this H level signal to the NOR gate 217. The 3-2 downshifting detector circuit 218 and 2-3 upshifting detector circuit 219 continue to feed L level signals to a NOR gate 217.

Therefore, during normal operating state when the shift switches 60 and 61 stay in their ON or OFF states, the shifting detector circuits 207, 208, 218 and 219 continue to feed L level signals to the NOR gate irrespective of the level of the signals from these shift switches, thus causing the NOR gate 217 to continue to issue a H level signal toward the AND gate 228. Accordingly, in this circumstance, the AND gate 228 generates a H level signal or a L level signal in response to the presence or absence of the lock-up signal $S_L$ (H level). If the AND gate 228 generates a H level signal upon reception of the lock-up permission signal $S_L$, this generated signal is applied via a bias resistor 229 to a base of a transistor 230 rendering same conductive so as to allow energization of the lock-up solenoid 31 with a power source $+V$ to enable the torque converter to operate in lock-up state. If the AND gate 228 generates a L level signal when it does not receive the lock-up permission signal $S_L$, the transistor 230 is rendered non-conductive, so that the lock-up solenoid 31 is deenergized so as to enable the torque converter 1 to operate in a torque converter state. It follows that the torque converter 1 is so controlled as to operate in lock-up state when in operation within ranges A, B, C as illustrated in FIG. 7, but to operate in torque converter state outside of these ranges.

However, during upshifting from the first gear ratio to the second gear ratio or from the second gear ratio to the third gear ratio or during downshifting from the third gear ratio to the second gear ratio or from second gear ratio to the first gear ratio, the corresponding shift switch 60 or 61 shifts upon such shifting operation and this change is detected by the shifting detector circuit 207, 208, 218 and 219 and a H level signal is generated for a predetermined time duration. This H level signal is fed through the NOR gates 217 to produce an L level signal. This L level signal causes the AND gate 228 to generate a L level signal even if there exists a lock-up permission signal $S_L$, thus preventing the lock-up solenoid 31 from being energized, thereby suspending the lock-up operation, with the result that the occurrence of a great shock that otherwise would occur if the shifting takes place when the torque converter remains in the lock-up state is prevented.

According to the present invention, however, there are time constants of the RC circuits of the shift detector circuits 207, 208, 218 and 219 which are provided for respective kinds of shifting commands. These time constants are adjusted to conform to gear shifting operation durations of the various kinds of shifting operations, so that each of the timed durations of the gear shift signals generated by the gear shifting detector circuits 207, 208, 218 and 219 conforms to the duration of a corresponding one of the actual gear shifting operations. The result is that the time duration of the suspension of the lock-up state which is caused in the above-mentioned manner by the above-mentioned gear shift signal can always conform to the actual gear shifting operation in any one kind of the various gear shiftings, thus preventing the occurrence of engine racing or the occurrence of shift shock.

FIG. 6 shows another embodiment according to the present invention which is so designed as to modify the duration of generation of a gear shift signal in accordance with engine load (throttle opening degree in this example) because the actual gear shifting operation differs depending upon the engine load as previously explained. Counterparts to those elements illustrated in FIG. 4 are designated by like reference numerals. In this embodiment an idle switch 70 and a full throttle switch 71 are incorporated. These switches coact with the accelerator pedal, wherein the idle switch 70 is rendered ON when the depression of the accelerator pedal is within a range smaller than a predetermined value (light load range), and the full throttle switch 71 is rendered ON when the accelerator pedal is depressed into a range greater than a predetermined value (great or heavy load range). The switches 70 and 71 are connected to the power source $+V$ through the respective resistors 76 and 77 so that the switch 70 detects light load operation, including idling operation of the engine and is closed to generate a L level signal, the switch 71 detects the large load operation and is closed to generate a L level signal. When the throttle opening degree is between then, viz., the engine operation with intermediate load, both of the switches 70 and 71 are open to generate H level signals, respectively.

The signals from the idle switch 70 and full throttle switch 71 are fed to a NAND gate 231, an AND gate 232 and a NAND gate 233. When the engine operates with a light engine load (i.e. the depression of the accelerator pedal is smaller than the predetermined level and the idle switch 70 is closed) a L level signal from the idle switch 70 causes the NAND gate 231 to generate a H level. When the engine operates with a high or heavy load (i.e. the accelerator pedal is depressed greater than the predetermined level and the full throttle switch 71 is closed) the L level signal from the full throttle switch 71 causes the NAND gate 233 to generate a H level signal. When the engine operates with intermediate load by manipulating the accelerator pedal between these predetermined levels and both of the idle and full throttle switches 70 and 71 are open, the H level signals generated cause the AND gate 232, which effects AND operation between these H level signals, to generate a H level signal. Viz., the NAND gate 231, AND gate 232 and NAND gate 233 feeds a H level signal to a corresponding AND gates 234, 235 and 236 depending upon the engine load state. Specifically, the gate 231 feeds an H level signal to the AND gate 234 in response to light load, the gate 232 feeds a H level signal to an AND gate 235 in response the intermediate load, and the gate 233 feeds a H level signal to the AND gate 236 in response to high load.

In this embodiment, edge trigger circuits 207a, 207b, 207c, 218a, 218b, 218c, each of which is similar to the gear shifting detector circuit 207 or 218 illustrated in FIG. 4 are provided, and edge trigger circuits 208a, 208b, 208c, 219a, 219b, 219c each of which is similar to the gear shifting detector circuit 208 or 219 are also provided. The circuits 207a, 208a, 218a, 219a are gear shifting detector circuits for operation with light load, using the circuit 207a as a 2-1 downshifting detector circuit, using the circuit 208a as a 1-2 upshifting detector circuit, using the circuit 218a as a 3-2 downshifting detector circuit, and using the circuit 219a as a 2-3 upshifting detector circuit. The circuits 207b, 208b, 218b, 219b are gear shifting detector circuits for operation with intermediate load, using the circuit 207b as a 2-1 downshifting detector circuit, using the circuit 208b as a 1-2 upshifting detector circuit, using the circuit 218b, as a 3-2 downshifting detector circuit, and using the circuit 219b as a 2-3 upshifting detector circuit. Furthermore, the circuits 207c, 208c, 218c and 219c are gear shifting detector circuits for operation with high or heavy engine load, using the circuit 207c as a 2-1 downshifting detector circuit, using the circuit 208c as a 1-2 upshifting detector circuit, using the circuit 218c as a 3-2 downshifting detector circuit, and using the circuit 219c as a 2-3 upshifting detector circuit.

The circuits 207a, 207b, 207c and the circuits 208a, 208b, 208c are fed with the signals of the 1-2 shift switch 60 and respond to a fall in this signal (2-1 downshifting command) and a rise in this signal (1-2 upshifting command), wherein, upon issuance of a 2-1 downshifting command, one of the circuits 207a, 207b, 207c continues to feed a gear shift signal (H level signal) to a corresponding one of OR gates 237, 238, 239 for a time duration determined by a time constant of a corresponding one of RC circuits of the circuits, and, upon issuance of a 1-2 upshifting command, one of the circuits 208a, 208b, 208c continues to feed a gear shift signal (H level signal) to a corresponding one of OR gates 237, 238, 239 for a time duration determined by a time constant of a corresponding one of RC circuits of the circuits. The circuits 218a, 218b, 218c and the circuits 219a, 219b, 219c are fed with the signal of the 2-3 shift switch 61 and respond to a fall in the signal (3-2 downshifting command) and a rise in the signal (2-3 upshifting command), wherein, in accordance with kinds of gear shifting commands, upon issuance of a 3-2 downshifting command, one of the circuits 218a, 218b, 218c continues to feed a gear shift signal (H level signal) to a corresponding one of OR gates 237, 238, 239 for a time duration determined by a time constant of a corresponding one of RC circuits of the circuits, and upon issuance of a 2-3 upshifting command, one of the circuits 219a, 219b, 219c feeds a gear shift signal (H level signal) to a corresponding one of the OR gates 237, 238, 239 for a time duration determined by a time constant of a corresponding one of RC circuits thereof.

Accordingly, when the transmission undergoes a shifting, the OR gates 237, 238, 239 feed H level signals to the corresponding AND gates 234, 235, 236 upon reception of gear shift signals generated from the gear shifting circuits corresponding to a gear shifting command, but, since these AND gates are fed also with the outputs from the NAND gate 231, AND gate 232 and NAND gate 233 and only one of the output signals from these gates 231 to 233 takes a H level in accordance with the engine load as previously described, only one of the AND gates 234, 235 and 236 which receives this H level signal feeds a H level signal to the NOR gate 217 while the gear shift signal is present. Then, the NOR gate 217 generates a L level signal to the AND gate 228, as previously described, thus deenergizing the lock-up solenoid 31 even when said lock-up permission signal $S_L$ is present so as to suspend the lock-up state, thereby preventing the occurrence of a shift shock.

According to this embodiment, therefore, the gear shifting detector circuits 207a, 207b, 207c, 208a, 208b, 208c, 218a, 218b, 218c, 219a, 219b, 219c are selectively used depending upon a various kinds of gear shifting commands and the engine load and the durations of the gear shift signals (lock-up suspension signal) are brought into conformity to the durations of actual gear shifting operations which differ depending upon the kinds of gear shifting commands and engine load by adjusting the time constant of each of the RC circuits of the above-mentioned gear shifting detector circuits, so that the duration of the lock-up suspension induced by the above-mentioned gear shift signal can be brought into conformity to the actual gear shifting duration over various kinds of gear shiftings and engine load, thus accomplishing more satisfactorily the intended object of preventing the occurrence of a shift shock.

In the previously described two embodiments, a gear shift signal appears simultaneously with the occurrence of a gear shifting command, but it is preferably to delay the occurrence of a gear shift signal because the actual gear shifting operation initiated upon expiration of a duration after the occurrence of a gear shifting command.

What is claimed is:

1. A lock-up control system for a lock-up type automatic transmission of an automotive vehicle having an engine, said transmission including a torque converter with a lock-up clutch, the torque converter being shiftable into a lock-up side or a torque converter state, the lock-up control system comprising:

means for determining when said vehicle is operating in a predetermined lock-up range and for generating a lock-up permission signal when said vehicle is operating within said predetermined lock-up range;

means for detecting the occurrence of a plurality of gear shifting commands from said transmission including at least a first gear shift command and a second gear shift command;

gear shifting detector means coupled to said detecting means for generating a gear shift signal when said detecting means detects one of said plurality of gear shifting commands, said gear shift signal having at least first and second time durations associated, respectively, with said first and second gear shift commands, said gear shift signal having said first time duration in response to said first gear shift command and having said second time duration in response to said second gear shift command, said first time duration being different from said second time duration; and means for receiving said lock-up permission signal and said gear shift signal and for energizing the lock-up clutch when said lock-up signal is present and said gear shift signal is absent and for temporarily disengaging the lock-up clutch for operation in a torque converter state for a time duration corresponding to time duration of the gear shift signal even when said lock-up permission signal is present.

2. A lock-up control system as claimed in claim 1, further including means for sensing a load on said engine and for generating a signal indicative of the engine load and wherein said gear shifting detector means is operable to vary the time duration of said gear shift signal to conform to the time duration of a corresponding actual gear shifting operation and to the engine load signal.

3. A lock-up control system for a lock-up type automatic transmission of an automotive vehicle having an engine, said transmission including a hydraulic control system for operating a plurality of fluid operated friction units which are selectively actuated to selectively establish one of a plurality of gear ratios, said transmission further including a torque converter having a lock-up clutch, said torque converter being shiftable into a lock-up state wherein the lock-up clutch is engaged or into a torque converter state wherein the lock-up clutch is released, the lock-up control system comprising:

means for determining when said vehicle is operating in one of a plurality of a predetermined lock-up ranges and for generating a lock-up permission signal when said vehicle is operating in one of said predetermined lock-up ranges;

means for detecting the occurrence of a plurality of gear shifting commands including at least first and second gear shifting commands from the hydraulic control system and for generating gear shifting command signals indicative of the detected gear shifting command including at least first and second gear shifting command signals indicative of said first and second gear shifting commands;

means coupled to said gear shifting command signal generating means for generating a gear shift signal having at least a first time duration associated with said first gear shifting command signal and a second time duration associated with said second gear shifting command signal, said gear shift signal having said first time duration in response to said first gear shifting command signal and having said second time duration in response to said second gear shifting command signal, said first time duration being different from said second time duration; and means coupled to said lock-up permission signal generating means and said gear shift signal generating means for engaging the lock-up clutch in response to the presence of said lock-up permission signal and the absence of said gear shift signal, and responsive to said gear shift signal for temporarily releasing the lock-up clutch for the time duration of said gear shift signal even when the lock-up permission signal is present.

4. A lock-up control system for a lock-up type automatic transmission of an automotive vehicle having an engine, said transmission including a hydraulic control system for operating a plurality of fluid operated friction units which are selectively actuated to selectively establish one of a plurality of gear ratios, said transmission further including a torque converter having a lock-up clutch, said torque converter with said lock-up clutch being shiftable into a lock-up state wherein the lock-up clutch is engaged or into a torque converter state wherein the lock-up clutch is released, the lock-up control system comprising:

means for determining when said vehicle is operating in one of a plurality of predetermined lock-up ranges and for generating a lock-up permission signal when said vehicle is operating in one of said predetermined lock-up ranges;

means for detecting the occurrence of a plurality of gear shifting commands from the hydraulic control system and for generating gear shifting command signals indicative of the detected gear shifting commands, said gear shifting command signals including at least first and second gear shifting command signals;

means for detecting engine load and for generating an engine load signal indicative of the detected load;

means, coupled to said gear shifting command signal generating means and said engine load signal generating means, for generating a gear shift signal having at least a first time duration determined in accordance with said first gear shifting command signal and said engine load signal and a second time duration determined in accordance with said second gear shifting command signal and said engine load signal, said gear shift signal having said first time duration in response to said first gear shifting command signal and said engine load signal, and having said second time duration in response to said second gear shifting command signal and said engine load, said first time duration being different from said second time durations; and means, coupled to said lock-up permission signal generating means and said gear shift signal generating means for engaging the lock-up clutch in response to the presence of said lock-up permission signal and the absence of said gear shift signal and responsive to said gear shift signal for temporarily releasing the lock-up clutch for the time duration of said gear shift signal even when the lock-up permission signal is present.

5. A lock-up control system for a lock-up type automatic transmission of an automotive vehicle having an engine, said transmission including a hydraulic control system for operating a plurality of fluid operated friction units which are selectively actuated to selectively establish one of a plurality of gear ratios, said transmission further including a torque converter having a lock-up clutch, said torque converter being shiftable into a lock-up state wherein the lock-up clutch is engaged or into a torque converter state wherein the lock-up clutch is released, the lock-up control system comprising:

means for determining when said vehicle is operating in one of a plurality of predetermined lock-up ranges and for generating a lock-up permission signal when said vehicle is operating in one of said predetermined lock-up ranges;

means for selectively generating one of a plurality of gear shift signals including at least first and second gear shift signals, each of said gear shift signals corresponding to the occurrence of one of a plurality of gear shifting commands of the hydraulic control system, said first gear shift signal having a time duration associated with a first gear shift command and being generated in response to said first gear shift command, said second gear shift signal having a time duration associated with a second gear shift command and being generated in response to said second gear shift command, said first time duration being different from said second time duration; and means, coupled to said lock-up permission signal generating means and said gear shift signal generating means, for engaging the lock-up clutch in response to the presence of said lock-up permission signal and the absence of said gear shift signal and responsive to said gear shift signal for temporarily releasing the lock-up clutch for the time duration of said gear shift signal even when said lock-up permission signal is present.

6. A lock-up control system as claimed in claim 5, wherein said gear shift signal generating means comprises a plurality of gear shift detectors, each of said gear shift detectors including a timing circuit having a time constant corresponding to an actual gear shifting operation, and each of said gear shift detectors being triggered in response to the occurrence of a corresponding gear shifting command, said gear shift signal generating means further comprising a logic gate coupled to said plurality of gear shift detectors.

7. A lock-up control system for a lock-up type automatic transmission of an automotive vehicle having an engine, said transmission including a hydraulic control system for operating a plurality of fluid operated friction units which are selectively actuated to selectively establish one of a plurality of gear ratios, said transmission further comprising a torque converter having a lock-up clutch, said torque converter being shiftable into a lock-up state wherein the lock-up clutch is engaged or into a torque converter state wherein the lock-up clutch is released, the lock-up control system comprising:

means for determining when said vehicle is operating in one of a plurality of predetermined lock-up ranges and for generating a lock-up permission signal when said vehicle is operating in one of said predetermined lock-up ranges;

means for detecting the occurrence of a plurality of gear shifting commands, including first and second gear shifting commands, from the hydraulic control system and for generating gear shifting command signals indicative of the detected gear shifting command including a first gear shifting command signal indicative of said first gear shifting command, and a second gear shifting command signal indicative of said second gear shifting command;

means for detecting engine load and for generating an engine load signal indicative of the detected load;

means, coupled to said gear shifting command signal generating means and said engine load signal generating means, for selectively generating one of a plurality of gear shift signals including a first gear shift signal associated with and generated in response to said first gear shifting command signal and a second gear shift signal associated with and generated in response to said second gear shifting command signal, said first gear shift signal having a time duration determined by said first gear shifting command signal and said engine load signal, and second gear shift signal having a time duration determined by said second gear shifting command signal and said engine load signal, said time duration of said first gear shift signal being different from said time duration of said second gear shift signal; and means, coupled to said lock-up permission signal generating means and said gear shift signal generating means, for engaging the lock-up clutch in response to the presence of said lock-up permission signal and the absence of said gear shift signal and responsive to said gear shift signals for temporarily releasing the lock-up clutch for said time duration of said gear shift signal even when said lock-up permission signal is present.

8. A lock-up control system as claimed in claim 7, wherein said gear shift signal generating means comprises a first group of gear shift detectors, each of said first group of gear shift detectors including a timing circuit having a time constant corresponding to an actual gear shifting operation under a first detected engine load condition, and each of said first group of gear shift detectors being triggered in response to the occurrence of a corresponding gear shifting command, and a second group of gear shift detectors, each of said second group of gear shifting detectors including a timing circuit having a time constant corresponding to an actual gear shifting operation under a second detected engine load condition, each of said second group of gear shift detectors being triggered in response to the occurrence of a corresponding gear shifting command, said gear shift signal generating means further comprising a logic gate means responsive to said engine load signal generating means for selectively enabling one of said first and second groups of gear shift detectors.

9. A lock-up control system for a lock-up type automatic transmission of an automotive vehicle, the transmission including a torque converter with a lock-up clutch and a hydraulic control system for operating a plurality of hydraulic devices to be selectively actuated to establish one of a plurality of gear ratios, the hydraulic control system having a plurality of shift valves including a first shift valve and a second shift valve, each of the shift valves including a spool movable between an upshift position thereof and a downshift position thereof, the torque converter being shiftable into a lock-up state wherein the lock-up clutch is engaged or a torque converter state wherein the lock-up clutch is released, the lock-up control system comprising:

means for determining whether the vehicle is operating in a predetermined lock-up range and generating a lock-up permission signal when the vehicle is operating in said predetermined lock-up range;

means responsive to movement of the spool of the first shift valve for generating a first shift command indicative signal and responsive to movement of the spool of the second shift valve for generating a second shift command indicative signal;

means responsive to said first and second shift command indicative signal for generating a gear shift signal having first and second time durations associated, respectively, with said first and second shift command indicative signals, said gear shift signal having said first time duration in response to said first shift command indicative signal, said gear shift signal having said second time duration in response to said second shift command indicative signal, said first time duration being different from said second time duration; and means responsive to said lock-up permission signal and said gear shift signal for engaging the lock-up clutch when said lock-up permission signal is present and said gear shift signal is absent and for temporarily disengaging the lock-up clutch for operation in the torque converter state as long as said gear shift signal is present even when said lock-up permission signal is present.

10. A lock-up control system for a lock-up type automatic transmission of an automotive vehicle having an engine, the transmission including a torque converter with a lock-up clutch and a hydraulic control system for operating a plurality of hydraulic devices to be selectively actuated to establish one of a plurality of gear ratios, the hydraulic control system having a plurality of shift valves including a first shift valve and a second shift valve, each of the shift valves including a spool movable between an upshift position thereof and a downshift position thereof, the torque converter being shiftable into a lock-up state wherein the lock-up clutch is engaged or a torque converter state wherein the lock-up clutch is released, the lock-up control system comprising:

means for determining whether the vehicle is operating in a predetermined lock-up range and generating a lock-up permission signal when the vehicle is operating in said predetermined lock-up range;

means for generating a load indicative signal indicative of a load imposed on the engine;

means responsive to movement of the spool of the first shift valve for generating a first shift command indicative signal and responsive to movement of the spool of the second shift valve for generating a second shift command indicative signal;

means responsive to said load indicative signal and said first and second shift command indicative signals for generating a gear shift signal having a first time duration determined in accordance with said first shift command indicative signal and said load indicative signal and a second time duration determined in accordance with said second shift command indicative signal and said load indicative signal, said gear shift signal being generated with said first time duration in response to said first shift command indicative signal and said load indicative signal when said first shift command indicative signal is generated, said gear shift signal being generated with said second time duration in response to said second shift command indicative signal and said load indicative signal when said second shift command indicative signal is generated, first time duration being different from said second time duration; and means responsive to said lock-up permission signal and said gear shift signal for engaging the lock-up clutch when said lock-up permission signal is present and said gear shift signal is absent and for temporarily disengaging the lock-up clutch for operation in the torque converter state as long as said gear shift signal is present even when said lock-up permission signal is present.

11. A lock-up control system for a lock-up type automatic transmission of an automotive vehicle, the transmission including a torque converter with a lock-up clutch and a hydraulic control system having a plurality of shift valves including a first shift valve and a second shift valve, each of the shift valves including a spool movable between an upshift position thereof and a downshift position thereof, the torque converter being shiftable into a lock-up state wherein the lock-up clutch is engaged or a torque converter state wherein the lock-up clutch is released, the lock-up control system comprising:

means for determining whether the vehicle is operating in a predetermined lock-up range and generating a lock-up permission signal when the vehicle is operating in said predetermined lock-up range;

a first shift switch mounted on the first shift valve, said first shift switch being responsive to movement of a spool of said first shift valve;

a second shift switch mounted on said second shift valve, said second shift switch being responsive to movement of a spool of the second shift valve;

a first edge trigger circuit means coupled with said first shift switch to be triggered thereby for generating a first signal having a first time duration;

a second edge trigger circuit means coupled with said second shift switch to be triggered thereby for generating a second signal having a second time duration which is different from said first time duration;

a gate means having inputs coupled with said first and second edge trigger circuit means, respectively, for receiving said first and second signals, said gate means delivering a gear shift signal when one of said first and second signals is present; and means responsive to said lock-up permission signal and said gear shift signal delivered by said gate means for engaging the lock-up clutch when said lock-up permission signal is present and said gear shift signal is absent and for temporarily disengaging the lock-up clutch for operation in the torque converter state as long as said gear shift signal is present even when said lock-up permission signal is present.

12. A lock-up control system for a lock-up type automatic transmission of an automotive vehicle having an engine, the transmission including a torque converter with a lock-up clutch and a hydraulic control system having a plurality of shift valves including a first shift valve and a second shift valve, each of the shift valves including a spool movable between an upshift position thereof and a downshift position thereof, the torque converter being shiftable into a lock-up state wherein the lock-up clutch is engaged or a torque converter state wherein the lock-up clutch is released, the lock-up control system comprising:

means for determining whether the vehicle is operating in a predetermined lock-up range and generating a lock-up permission signal when the vehicle is operating in said predetermined lock-up range;

means for generating a first load indicative signal when a load imposed on the engine satisfies a first predetermined condition;

means for generating a second load indicative signal when the load imposed on the engine satisfies a second predetermined load condition;

a first shift switch mounted on the first shift valve, said first shift switch being responsive to movement of the spool of said first shift valve;

a second shift switch mounted on said second shift valve, said second shift switch being responsive to movement of the spool of the second shift switch;

a first edge trigger circuit means coupled with said first shift switch to be triggered thereby for generating a first signal having a first time duration;

a second edge trigger circuit means coupled with said second shift switch to be triggered thereby for generating a second signal having a second time duration;

a first gate means having inputs coupled with said first and second edge trigger circuit means, respectively, for receiving said first and second signals, said gate means delivering a first output signal when one of said first and second signals is present;

a third edge trigger circuit means coupled with said first shift switch to be triggered thereby for generating a third signal having a third time duration;

a fourth edge trigger circuit means coupled with said second shift switch to be triggered thereby for generating a fourth signal having a fourth time duration, said first, second, third and fourth time durations being different from each other;

a second gate means having inputs coupled with said third and fourth edge trigger circuit means, respectively, for receiving said third and fourth signals, said gate means delivering a second output signal when one of said third and fourth signals is present;

a third gate means having inputs coupled with said first gate means and said first load indicative signal generating means for delivering a third output signal when said first output signal and said first indicative load signal are present;

a fourth gate means having inputs coupled with said second gate means and said second load indicative signal generating means for delivering a fourth output signal when said second output signal and said second load indicative signal are present;

a fifth gate means having inputs coupled with said third and fourth gate means for delivering a gear shift signal when one of said third and fourth output signals delivered by said third and fourth gate means is present; and means responsive to said lock-up permission signal and said gear shift signal delivered by said fifth gate means for engaging the lock-up clutch when said lock-up permission signal is present and said gear shift signal is absent and for temporarily disengaging the lock-up clutch for operation in the torque converter state as long as said gear shift signal is present even when said lock-up permission signal is present.

* * * * *